US007206025B2

(12) United States Patent
Choi (10) Patent No.: US 7,206,025 B2
(45) Date of Patent: Apr. 17, 2007

(54) DEVICE AND METHOD FOR CONVERTING FORMAT IN DIGITAL TV RECEIVER

(75) Inventor: Seung Jong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 09/814,858

(22) Filed: Mar. 23, 2001

(65) Prior Publication Data

US 2003/0206242 A1 Nov. 6, 2003

(51) Int. Cl.
H04N 3/27 (2006.01)
H04N 5/46 (2006.01)
H04N 5/268 (2006.01)
H04N 7/01 (2006.01)
H04N 11/20 (2006.01)

(52) U.S. Cl. ................ 348/441; 348/443; 348/450; 348/454; 348/455; 348/459; 348/554; 348/555; 348/556; 348/557; 348/558; 348/705

(58) Field of Classification Search ........... 348/441, 348/443, 450, 454–455, 459, 554, 556–558; H04N 5/46
See application file for complete search history.

(56) References Cited

U.S. PATENT DOCUMENTS

| | | | | |
|---|---|---|---|---|
| 5,475,442 A * | 12/1995 | Matsushita et al. | ......... | 348/554 |
| 5,650,824 A * | 7/1997 | Huang | ......... | 348/453 |
| 5,699,123 A * | 12/1997 | Ebihara et al. | ......... | 348/445 |
| 5,760,840 A * | 6/1998 | Tani et al. | ......... | 348/558 |
| 5,801,785 A * | 9/1998 | Crump et al. | ......... | 348/563 |
| 5,850,266 A * | 12/1998 | Gimby | ......... | 348/558 |
| 5,982,459 A * | 11/1999 | Fandrianto et al. | ......... | 348/425.3 |
| 6,057,889 A * | 5/2000 | Reitmeier et al. | ......... | 348/555 |
| 6,157,396 A * | 12/2000 | Margulis et al. | ......... | 345/506 |
| 6,175,387 B1 * | 1/2001 | Han | ......... | 348/565 |
| 6,204,884 B1 * | 3/2001 | Lee | ......... | 348/555 |
| 6,229,574 B1 * | 5/2001 | Han | ......... | 348/555 |
| 6,297,850 B1 * | 10/2001 | Han et al. | ......... | 348/521 |
| 6,310,659 B1 * | 10/2001 | Glen | ......... | 348/589 |
| 6,340,994 B1 * | 1/2002 | Margulis et al. | ......... | 348/625 |
| 6,373,527 B1 * | 4/2002 | Lee | ......... | 348/564 |
| 6,404,889 B1 * | 6/2002 | Ryan et al. | ......... | 380/201 |
| 6,421,094 B1 * | 7/2002 | Han | ......... | 348/569 |
| 6,456,340 B1 * | 9/2002 | Margulis | ......... | 348/745 |
| 6,462,786 B1 * | 10/2002 | Glen et al. | ......... | 348/599 |
| 6,466,272 B1 * | 10/2002 | Arai et al. | ......... | 348/555 |

(Continued)

FOREIGN PATENT DOCUMENTS

KR 1999-0046874 7/1999

*Primary Examiner*—Brian P. Yenke
(74) *Attorney, Agent, or Firm*—Birch, Stewart, Kolasch & Birch, LLP (57) ABSTRACT

Device and method for converting a format of a video signal in a digital TV receiver is provided. Format conversion can be carried out at one chip of a format converting device, inclusive of conversion of resolution, frame rate, scanning method, aspect ratio, color space, chroma format, and gamma correction. Therefore, the digital TV receiver is made to convert a wide range of video signals inclusive of, not only a digital TV broadcasting signal, but also analog TV broadcasting signal, and computer video signal, at one chip of system block. Moreover, the digital TV receiver is made to provide a variety of standards of format converted video signals, not only to the connected display, but also to other general video signal processing devices.

3 Claims, 5 Drawing Sheets

U.S. PATENT DOCUMENTS

| | | | |
|---|---|---|---|
| 6,489,997 B1 * | 12/2002 | Stapleton | 348/441 |
| 6,501,510 B1 * | 12/2002 | Moon | 348/553 |
| 6,515,710 B1 * | 2/2003 | Koshimuta | 348/557 |
| RE38,079 E * | 4/2003 | Washino et al. | 348/722 |
| 6,549,243 B1 * | 4/2003 | Takashimizu et al. | 348/558 |
| 6,710,817 B2 * | 3/2004 | Oku et al. | 348/569 |
| 6,727,960 B2 * | 4/2004 | Seo | 348/731 |
| 6,731,347 B1 * | 5/2004 | Takano et al. | 348/558 |
| 2002/0063807 A1 * | 5/2002 | Margulis | 348/745 |
| 2002/0145610 A1 * | 10/2002 | Barilovits et al. | 345/538 |
| 2003/0137604 A1 * | 7/2003 | Takashimizu et al. | 348/554 |

* cited by examiner

DEVICE AND METHOD FOR CONVERTING FORMAT IN DIGITAL TV RECEIVER

BACKGROUND OF THE INVENTION

1. Field of the Invention

The present invention relates to a chip device and method for converting a format of a video signal in a digital TV receiver.

2. Discussion of the Related Art

The format converting chip is a device for converting formats of various video signals, such as color space, and chroma formats. In general, there are a variety of video standards, inclusive of digital TV broadcasting, analog TV broadcasting, such as NTSC, PAL, SECAM, and, other digital pictures, such as S-video, and computer video signals, such as VGA, SVGA, and XGA. That is, there are different video standards for different system applications. The video signal standards can be sorted with reference to the following formats.

First, there are spatial resolutions of 720×480, 1280×720, and 1920×1080 pixels depending on system applications. There are frame rates of 24, 30, 59.94, 60, and 80 Hz depending on system applications. There are scanning methods of interlace scanning and progressive scanning depending on system applications. There are screen aspect ratios of 4:3, 16:9, and 14:9 depending on system applications. There are color spaces and gamma corrections of RGB, $YC_bC_r$, YUV, and YIQ and the like depending on system applications. Finally, there are chroma formats of 4:2:0, 4:1:1, 4:2:2, and 4:4:4 depending on system applications.

Different from current analog television broadcasting, the digital TV broadcasting supports multi-format of video signal. In general, the format herein denotes four kinds of formats of the spatial resolution, the frame rate, the scanning method, and the aspect ratio. Accordingly, the digital TV receiver can receive a variety of video signals, such as an HD (High Definition) class video signal, an SD (Standard Definition) class video signal, a computer video signal, and an analog TV broadcasting signal, requiring to receive and process various kinds of video signals. That is, the digital TV receiver is expected to have applications to a variety of displays, such as, not only to a Braun tube TV receiver and projection TV receiver, both of the interlace scanning method, but also to LCD (Liquid Crystal Display) and PDP (Plasma Display Panel), both of the progressive scanning method, and computers.

Consequently, the digital TV receiver is required to provide video signals on a variety of formats, and to be provided with a format converting device for converting input video signals on different formats into output video signals on desired formats. Conventionally, conversions of the spatial resolutions, the frame rates, the scanning methods have been in general defined as format conversions. Recently, besides the foregoing format items, methods for adding the aspect ratios thereto are suggested. The format converting device in the digital TV receiver converts input video signals on various formats into output video signals on desired formats, i.e., for an example, the format converting device converts the spatial resolutions, the frame rates, the scanning methods, and the aspect ratios consistent to desired output formats.

Figure 1:
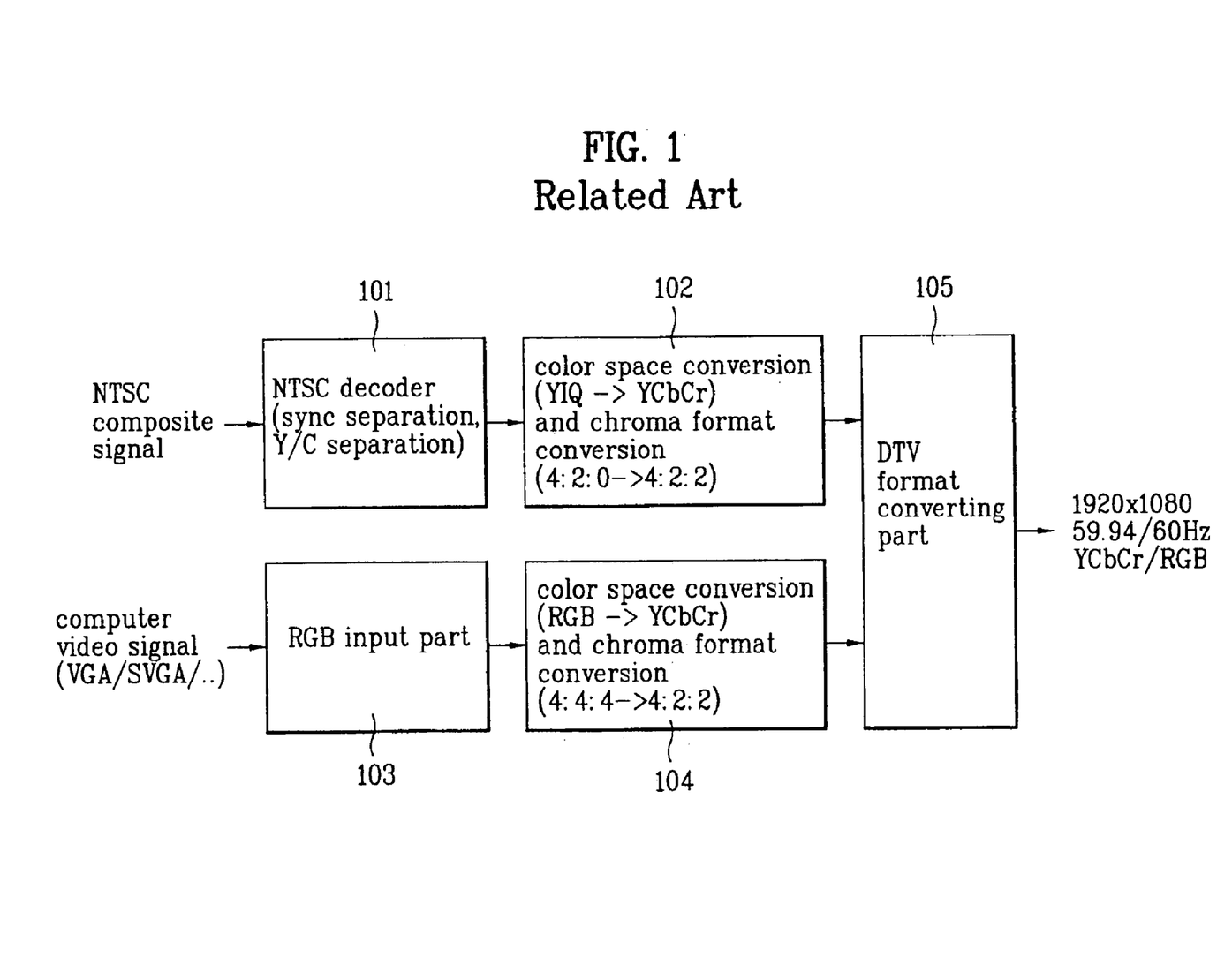
FIG. 1 illustrates a block diagram showing a related art format converting device in a digital TV receiver.

FIG. 1 illustrates a block diagram showing a related art format converting device in a digital TV receiver for converting formats of video signals of analog TV broadcastings, and computers.

For an example, when video signals on different formats are received at the digital TV receiver, the format converting part therein converts a format of a received video signal into a video format (for an example, 1920*1080, 60 Hz, and YCbCr) required by the digital TV receiver, and a video signal on the converted format is provided to the digital TV receiver. In other words, upon reception of a digital broadcasting signal, the format converting part 105 analyzes the four kinds of format information contained in a digital bitstream, and carries out an appropriate format conversion by using the analyzed four kinds of format information. On the other hand, because the analog TV broadcasting video signals and the computer video signals contain no format information, the digital TV receiver is in general required to convert formats of the input video signals into 601 formats (i.e., component digital interface standards) the CCIR recommends. Then, the format converting part 105 can convert the format of the input video signal.

For an example, upon reception of an NTSC TV broadcasting composite video signal, an NTSC decoder 101 separates a horizontal synchronizing signal and a vertical synchronizing signal, and a luminance signal 'Y' and a color signal 'C' therefrom. If necessary, a color converting part 102 makes a color space conversion (for an example, YIQ→YCbCr) and a chroma format conversion (for an example, 4:2:0→4:2:2) of the input video signal, and forwards the result to the format converting part 105. By the way, the VGA and SVGA and the like, computer video signals, are provided to the digital TV receiver through an RGB input part 103 in forms of RGB, when a color converting part 104 makes a color space conversion (for an example, RGB→YCbCr) and a chroma format conversion (for an example, 4:4:4→4:2:2) of the input video signal, and forwards the result to the format converting part 105.

As described, the related art format converting device can not make a direct format conversion of the external video signals, such as the computer video signals and the analog TV broadcasting video signals. As shown in FIG. 1, in order to convert a format of an input video signal, separate color space conversion and chroma format conversion are required according to the kinds of the video signals at a step prior to the related art format converting device. At the end, as individual hardware is required according to the number of input video signals, not only the production cost is high, but also the system is complicated. In other words, every time, an external video signal is added, additional hardware is required for making the chroma format conversion and the color space conversion prior to the format conversion part. Taking the trend of gradual integration of many media into the digital TV receiver into account, it is foreseen that a wider variety of video signals will be provided to the digital TV receiver, to require additional converting parts, other than the format converting part, for the chroma format conversion and the color space conversion, that leads hardware of the digital TV receiver bulky.

SUMMARY OF THE INVENTION

Accordingly, the present invention is directed to a chip device and method for converting a format of a video signal in a digital TV receiver that substantially obviates one or more of the problems due to limitations and disadvantages of the related art.

An object of the present invention is to provide a chip device and method for converting a format of a video signal in a digital TV receiver, which can reduce hardware and drop a cost.

Another object of the present invention is to provide a chip device and method for converting a format of a video signal in a digital TV receiver, which can convert, not only a spatial resolution, a frame rate, a scanning method, an aspect ratio, but also a color space, a gamma correction, and chroma format, of a received video signal, at a time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for converting a format of a video signal in a digital TV receiver has a form of one chip, including a video signal receiving part, a format detecting part, and a video signal forwarding part. The video signal receiving part receives at least one kind of video signals, and stores the received video signals to a memory in the chip. The format detecting part detects format information from the received video signal. The format converting part converts formats of the video signal stored in the memory into output formats by using the detected format information and output format information provided by a user, and stores the format converted video signal to the memory, again. The video signal forwarder forwards the format converted video signal to a desired display.

In one embodiment, the format information of the received video signals includes a spatial resolution, a frame rate, a scanning method, an aspect ratio, a color space, a gamma correction, and chroma format.

In one embodiment, the received video signal includes a digital TV broadcasting bitstream, an analog TV video signal, a computer video signal, and other digital video signals.

In one embodiment, the format detecting part detects format information by using a synchronizing signal of the received video signal when the received video signal has no format information.

As explained, it is understood that the present invention expands services of the related art format converting device. That is, the digital TV receiver is made to be able to process a wider variety of video signals. Accordingly, a format conversion performance of the digital TV receiver is improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 2:
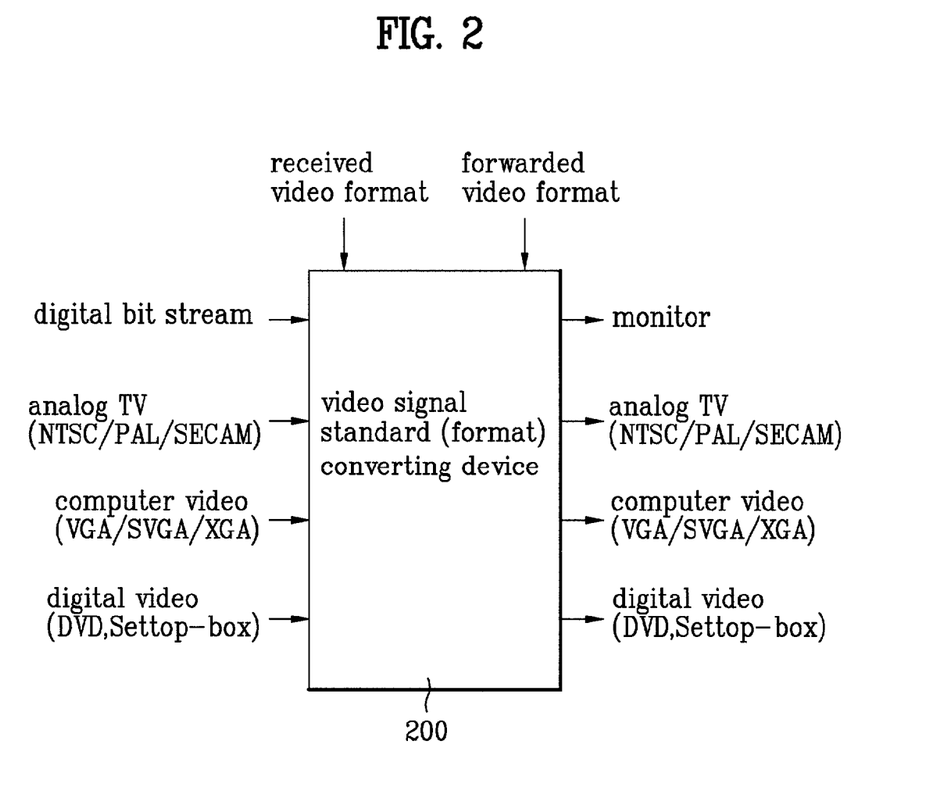
FIG. 2 illustrates a block diagram showing concept of a format converting device in a digital TV receiver in accordance with a preferred embodiment of the present invention.
Figure 3:
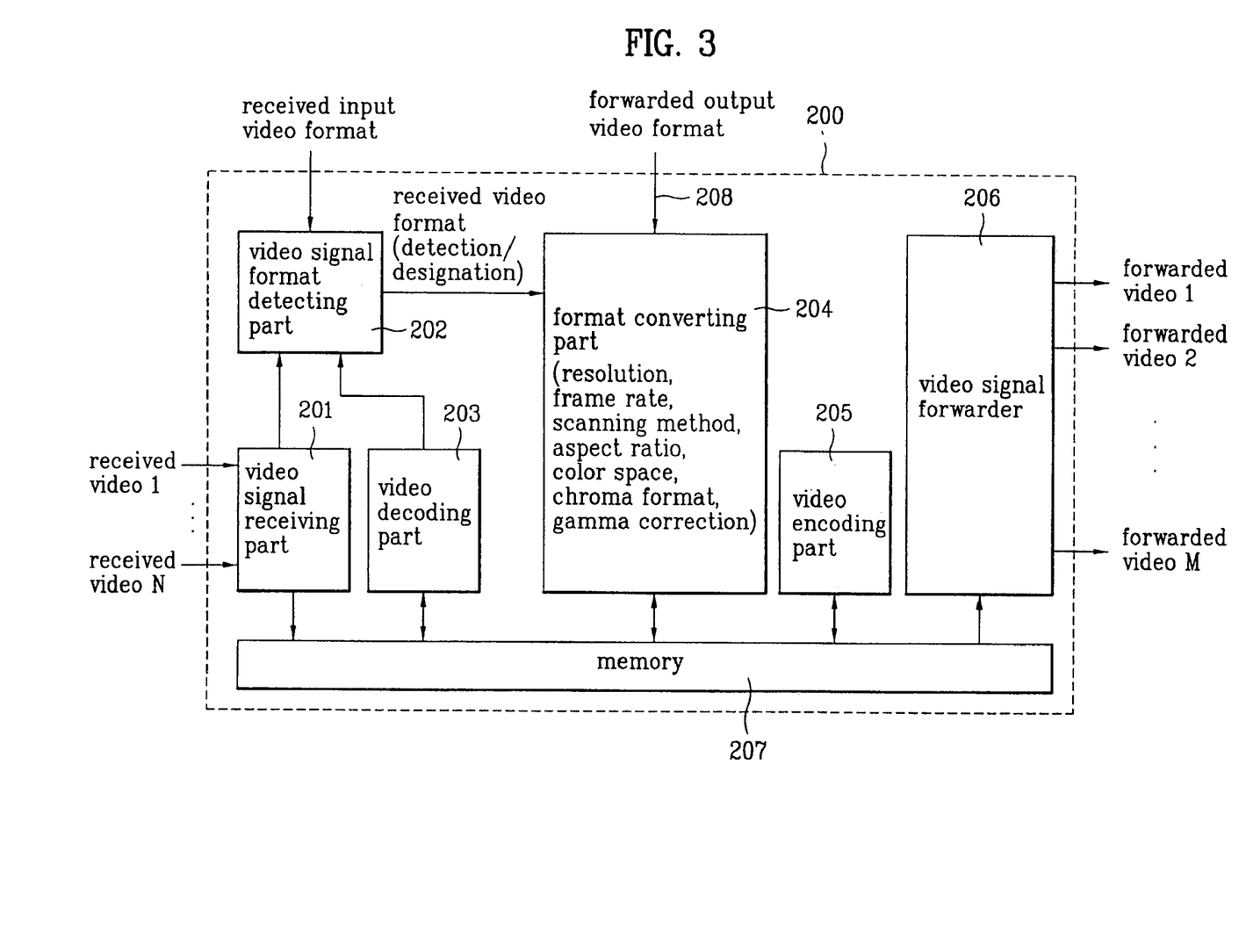
FIG. 3 illustrates a block diagram showing a detailed system of a format converting device in a digital TV receiver in accordance with a preferred embodiment of the present invention.

Reference will now be made in detail to the preferred embodiments of the present invention, examples of which are illustrated in the accompanying drawings. FIG. 2 illustrates a block diagram showing concept of a format converting device in a digital TV receiver in accordance with a preferred embodiment of the present invention, wherein various input signals are converted into video signals of desired formats at a format converting device 200 integrated into one chip. FIG. 3 illustrates a block diagram showing a detailed system of the format converting device 200 in a digital TV receiver in accordance with a preferred embodiment of the present invention.

Referring to FIGS. 2 and 3, the device 200 for converting a format of a video signal in a digital TV receiver includes a video signal receiver 201 for receiving a one or more video signals, a video decoder 203 for decoding the video signal if the video signal is compressed, a format detecting part 202 for detecting a video signal format from the video signal received from the video signal receiver 201 and the video decoder 203, or format information the user designates, a format converting part 204 for converting the format of the video signal from the format detecting part 202 to a desired format, a video encoder 205 for compressing the format converted video signal when the desired output format is in a compressed form, a memory 207 for storing results of processing at different parts, and a video signal forwarder 206 for reading a video signal of a desired standard (or format) from the memory 207 and forwarding the video signal.

As described, different standards of video signals are received at the device 200 for converting a format of a video signal in a digital TV receiver of the present invention. For an example, the received video signal may be a compressed bitstream of a digital broadcasting signal, an analog TV broadcasting signal such as SECAM, a computer video signal such as VGA, SVGA, and XGA, and a decoded digital bitstream for DVD or a set top box. Alike the received video signals, different standards of video signals are forwarded. That is, the forwarded video signals can be the monitor video signals, the decoded digital bitstreams, the analog TV broadcasting video signals, and/or the computer video signals. That is, at least one video signal of a certain standard is received by the device 200 and at least one format converted video signal is forwarded or output by the device 200.

Upon reception of any one of the different video signals, the video signal receiver 201 stores the received video signal in the memory 207 through an interfacing part, and, at the same time, forwards it to the format detecting part 202 for detecting a format of the received video signal. But, when the received video signal is compressed, the video decoder 203 reads the received video signal stored in the memory 207 at first. Then, the video decoder 203 decodes the received video signal, and stores the decoded video signal in the memory 207, again. At the same time, in order to detect a format of the received video signal, the decoded video signal is forwarded from the decoder 203 to the format detecting part 202. That is, when the received video signal is a compressed digital bitstream, the video decoder 203 decodes the compressed digital video stream so that the decoded video signal is processed by the format detecting part 202. The compressed digital video stream is a digital TV broadcasting video signal. In this instance, the video decoder 203 may be an MPEG2 MP@HL. The video signal format detecting part 202 detects a format of the video signal received from the video signal receiver 201 or from the video decoder 203, or a format of a received video signal the user provided and designated, and forwards the detection result to the format converting part 204.

Figure 4:
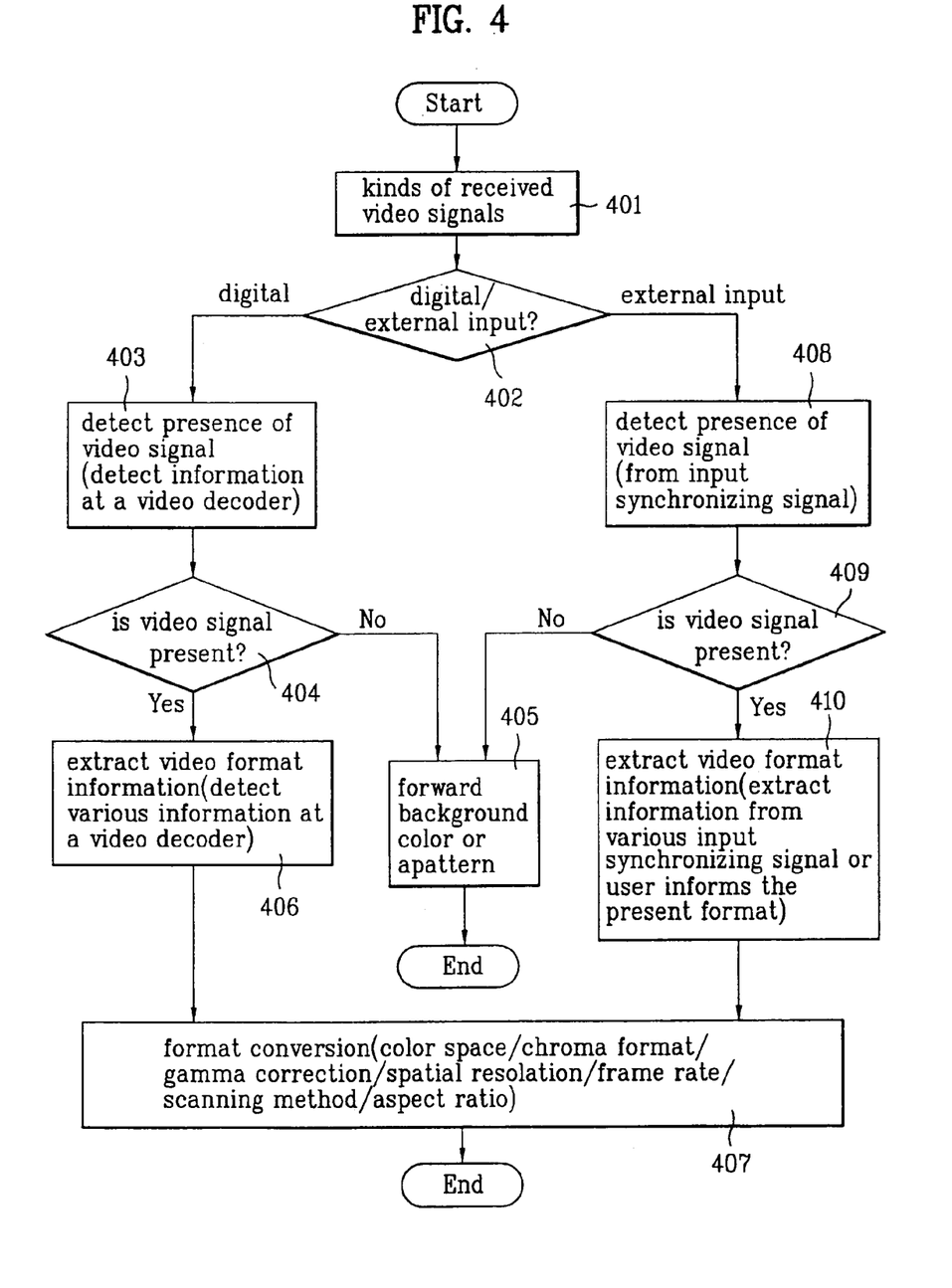
FIG. 4 illustrates a flow chart showing an operation of the format converting part in FIG. 3; and, FIG. 5 illustrates a diagram showing an exemplary color space conversion of the present invention.

FIG. 4 illustrates a flow chart showing an operation of the format detecting part 202, the video decoding part 203, and the format converting part 204 in FIG. 3.

Referring to FIG. 4, if format information of the received video signal is included in the received video signal, the format information is taken from the received video signal. If the format information is not included in the received video signal, the format information is detected by using a synchronizing signal of the received video signal, or by using format information given by the user.

At first, upon reception of the video signal (step 401), the received video signal is discriminated to be either a compressed digital bitstream of a digital TV broadcasting, or an external signal such as a computer video signal. (step 402). If the received digital video signal is determined to be the compressed digital bitstream, i.e., the digital TV broadcasting signal, presence of an actual video signal in the received video signal is detected (step 403). If there is no actual video signal in the received video signal (step 404), a background color or a preset pattern is forwarded to the display (step 405). Opposite to this, if it is determined that the actual video signal is present in the received video signal (step 404), the format information is detected and extracted from the received video signal (step 406). In this instance, the information on the presence of the actual video signal in the received video signal and the format information can be detected from the video signal decoded at the video decoder 203.

On the other hand, if the received video signal is determined not to be the digital TV broadcasting signal, but to be the external signal such as a computer video signal, which basically has no information on the format (step 402), the format converting device detects the presence of the actual video signal in the received video signal from a synchronizing signal of the received video signal (step 408). If it is determined that the actual video signal is not present in the received video signal (step 409), the background color or the preset pattern is forwarded to the display (step 405). If it is determined that the actual video signal is present in the received video signal (step 409), the format of the received video signal is detected by using the synchronizing signal of the received video signal, or the format information provided and designated by the user, e.g., via a D-connector cable 208 (step 410). In other words, when the received video signal is the external signal, and when the format information is not carried on the video signal, the format of the received video signal is detected form the synchronizing signal or the information given and designated by the user. Thus, upon detection of the format of the received video signal, the format is provided to the format converting part 204.

For converting the format of the received video signal provided from the video signal format detecting part 202, the format converting part 204 carries out seven format converting steps, and stores a format converted video signal at the memory 207 (step 407). That is, the format converting part 204 carries out format conversions of the spatial resolution, the frame rate, the scanning method, the aspect ratio, the color space, and the chroma format, and the gamma correction of the received video signal. As the gamma correction changes a luminance 'Y' of the received video signal, the gamma correction is also taken as a format conversion. Although the gamma correction is required when the display is a digital TV receiver, the same is not required when the display is a personal computer.

The format converted video signal is then stored in the memory 207 and accessed by the video encoder 205.

Figure 5:
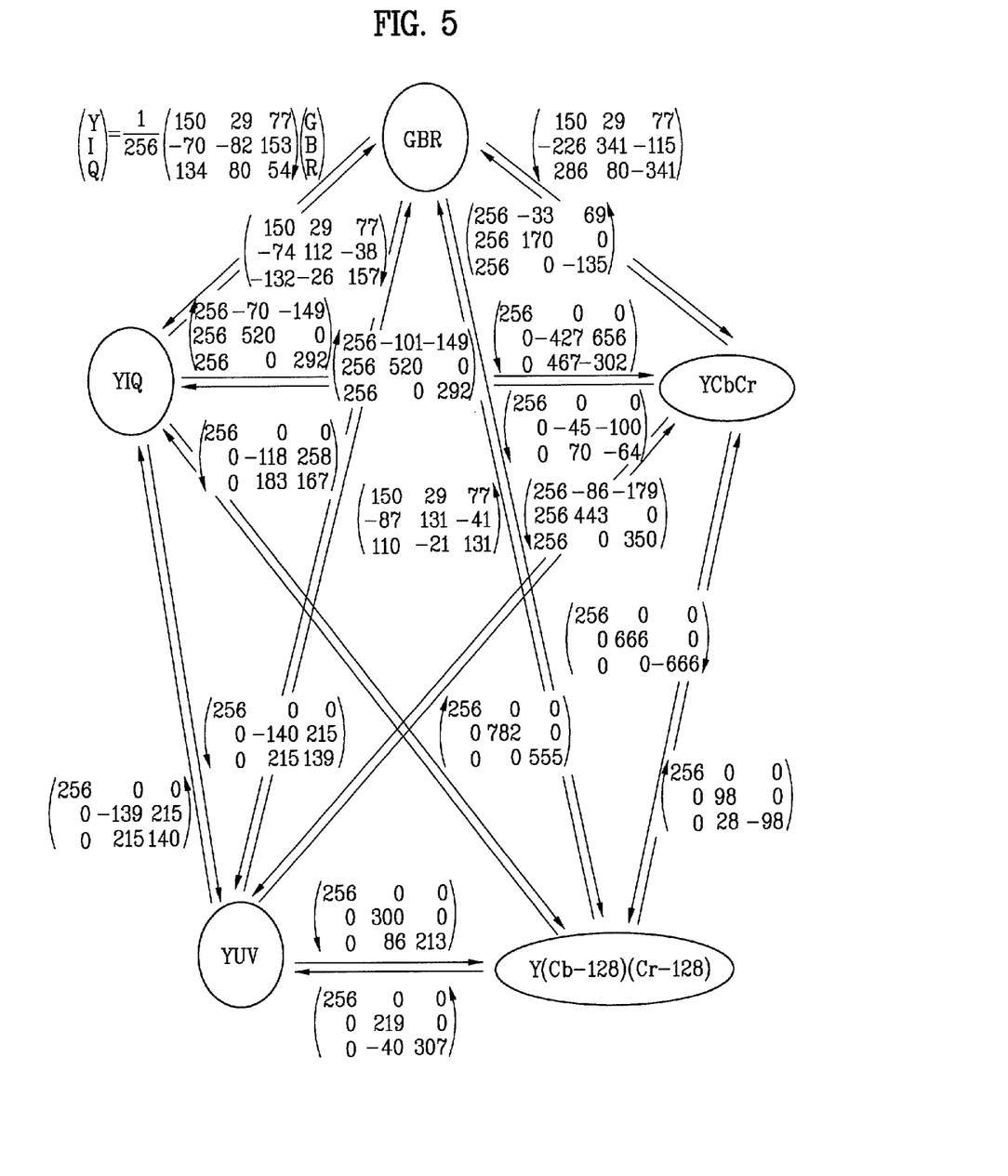

FIG. 5 illustrates a diagram showing an exemplary color space conversion of the present invention.

Referring to FIG. 5, when the color space of the received video signal is Y(Cb-128)(Cr-128), and a desired color space is RGB, the color space conversion can be carried out according to the following equation (1).

$$\begin{bmatrix} R \\ G \\ B \end{bmatrix} = \begin{bmatrix} 256 & -86 & -179 \\ 256 & 443 & 0 \\ 256 & 0 & 350 \end{bmatrix} \begin{bmatrix} Y \\ Cb-128 \\ Cr-128 \end{bmatrix} \quad (1)$$

$$R = 256*Y - 86(Cb-128) - 179(Cr-128)$$

$$G = 256*Y + 443(Cb-128)$$

$$B = 256*Y350(Cr-128)$$

As explained, if the user desired output format is the compressed bitstream, the video encoder 205 reads the format converted video signal stored in the memory 207 at first. Then, after compressing the format converted video signal, the compressed video signal is stored in the memory 207, again. The video signal forwarding part 206 reads the video signal converted to the desired output standard from the memory 207 and forwards it through the interface part (not shown). For an example, assume that the received video signal is the computer video signal, the color space is a RGB form, and the chroma format is in a 4:4:4 form. For displaying the received computer video signal on the digital TV receiver, the format converting part 204 converts the resolution, the frame rate, the scanning method, and the aspect ratio of the received video signal consistent with the desired output format. Moreover, the format converting part 204 converts the color space of the RGB form into YCbCr form, and chroma format of the 4:4:4 form into 4:2:0 form. As explained, if necessary, the gamma correction can be carried out as a part of the format conversion.

The present invention can support format conversions between different video standards with ease.

As has been explained, besides the conversions of present format information of the resolution, the frame rate, the scanning method, and the aspect ratio, the present invention adds format conversions on the color space, chroma format, and the gamma correction. Accordingly, formats of a wide variety of video signals inclusive of, not only the digital TV broadcasting video signal, but also the analog TV broadcasting signal, and the computer video signal, can be converted within the same one chip.

All video signals can be converted into video signals of other standards, and the format converted video signals can be provided, not only to the display, but also to a general video signal processor such as a DVD player, a set top box, etc.

Formats of video signals of any standards can be converted in one chip. Therefore, addition of hardware is not required, even if a new external signal is added.

It will be apparent to those skilled in the art that various modifications and variations can be made in the chip device and method for converting a format of a video signal in a digital TV receiver of the present invention without departing from the spirit or scope of the invention. Thus, it is intended that the present invention cover the modifications and variations of this invention provided they come within the scope of the appended claims and their equivalents.

What is claimed is:

1. A device for converting a format of a video signal comprising:
    a memory;
    a video signal receiving part for receiving a compressed digital TV broadcasting signal and an external video signal via a common input, and storing the received video signal in the memory;
    a video decoder for decoding the received video signal stored in the memory if the received signal is the compressed signal;
    a format detecting part for receiving the digital TV broadcasting signal and the external video signal from the memory, and detecting format information from the received digital TV broadcasting signal or extracting the format information from the synchronizing signal of the external video signal;
    a format converting part for converting on a single chip all of a spatial resolution, a frame rate, a scanning method, an aspect ratio, a color space, a chroma format, and a gamma correction of the received signal, using the format information from the format detecting part, according to output information transmitted by a user; and
    a video signal forwarder for forwarding the format converted video signal if there is a received signal, and the predetermined video signal if there is no received signal,
    wherein the format converted video signal is one of a digital TV broadcasting bitstream, an analog TV broadcasting video signal, a computer signal, and an analog/digital type signal,
    wherein the video signal receiving part has an output connected to the memory for storing the received video signal in the memory and an output connected to the format detecting part for sending a non-compressed received video signal directly to the format detecting part to thereby detect a format of the video signal,
    wherein the video decoder has an input connected to the memory for receiving a stored compressed video signal to thereby decode the compressed video signal and has an output connected to the detecting part to send the decoded video signal to the detecting part to thereby detect a format of the video signal, and
    wherein the format detecting part has a first input for receiving an input video format from a user, a second input for receiving the non-compressed video signal from the video signal receiving part, a third input for receiving the decoded video signal from the decoder and an output connected to the format converting part for sending a detected format of the corresponding video signal to the format converting part such that the format converting part can convert on the single chip all of the spatial resolution, the frame rate, the scanning method, the aspect ratio, the color space, the chroma format, and the gamma correction of the received signal using the format information from the format detecting part, according to output information transmitted by the user.

2. The device as claimed in claim 1, wherein the analog TV broadcasting video signal is an NTSC broadcasting signal, a PAL broadcasting signal, or a SECAM broadcasting signal,
    wherein the computer video signal is a VGA signal, an SVGA signal, or an XGA signal, and
    wherein the analog/digital type signal is a DVD signal or a set top box signal.

3. The device as claimed in claim 1, wherein the video signal forwarder forwards the format converted video signal being an analog video output, a digital video output or a compressed video output.

* * * * *

UNITED STATES PATENT AND TRADEMARK OFFICE
CERTIFICATE OF CORRECTION

| | | |
|---|---|---|
| PATENT NO. | : 7,206,025 B2 | Page 1 of 1 |
| APPLICATION NO. | : 09/814858 | |
| DATED | : April 17, 2007 | |
| INVENTOR(S) | : Seung Choi | |

It is certified that error appears in the above-identified patent and that said Letters Patent is hereby corrected as shown below:

On the title page please add the following information below line [22]

Item
--[30] Foreign Application Priority Data

March 24, 2000 [KR]   Korea............10-2000-0015046--

Signed and Sealed this

Nineteenth Day of February, 2008

JON W. DUDAS
*Director of the United States Patent and Trademark Office*